S. N. BARUCH.
PULSE AMPLIFIER.
APPLICATION FILED MAY 24, 1917.

1,403,384. Patented Jan. 10, 1922.

Witnesses
H. J. Shade
J. B. Manchester

Inventor
Sydney N. Baruch
By
Attorney

UNITED STATES PATENT OFFICE.

SYDNEY N. BARUCH, OF SAN FRANCISCO, CALIFORNIA.

PULSE AMPLIFIER.

1,403,384.  Specification of Letters Patent.  Patented Jan. 10, 1922.

Application filed May 24, 1917. Serial No. 170,784.

*To all whom it may concern:*

Be it known that I, SYDNEY N. BARUCH, a citizen of the United States, residing at 406 Sutter Street, San Francisco, in the county of San Francisco and State of California, have invented certain new and useful Improvements in Pulse Amplifiers, of which the following is a specification.

This invention relates to the amplifying of impulses derived from the human pulse, and has for its object the indication of these impulses.

Other devices have been used for indicating blood pressure and variation of pulse but they have proven rather limited in their scope as to the slight variations in blood pressure or heart impulse. It has become evident that a device of this kind is of great value in medical diagnosis as the vibrations or radiations from all forms of applied matter and energy have their effect directly or indirectly upon the heart actions and reactions which are some times so minute that the present known instruments will not indicate the variations. The effect of germs in culture and other forms have shown their effect on the heart action and indicated by this invention.

In the accompanying drawings Figure 1 shows an assembled view of the apparatus used in connection with loading coil and transmitter for repeating, amplifying and indicating the impulse electrically.

Figure 1:
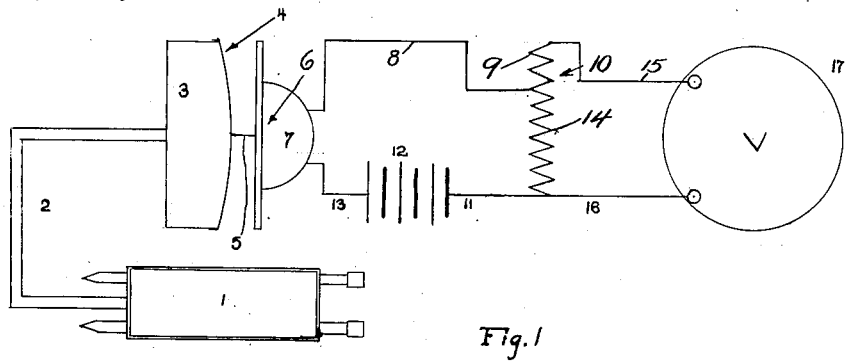

I shall now describe the specific form of the device which I have selected for illustration herein:

The device comprises an arm piece 1, connected by rubber hose 2 to air chamber 3 having a diameter much greater than the hose and provided with rubber diaphram 4 and diaphram pin 5 connected to the telephone transmitter diaphram 6 which reproduces the vibrations produced on diaphram 4 and connects them through the primary circuit comprised of the telephone transmitter 7 conductor 8 coil 14 of the auto-transformer 10, conductor 11 through battery 12 and conductor 13 the voltage produced across the secondary member, comprising coils 9 and 14, of transformer 10 acting through conductors 15 and 16 to produce an indication on volt meter 17. The faint impulses of the pulse acting on the pneumatic pad 1 are thus visualized and amplified by the indications of the needle of the voltmeter.

Figure 2:
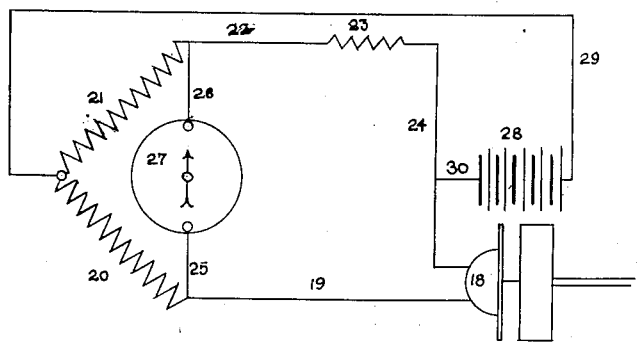
Figure 2 shows the galvanometric bridge circuit and transmitter for repeating and amplifying impulses electrically.

Another form of the amplifier is shown in Figure 2 in which the vibration responsive telephone transmiter 18 is in a balanced circuit composed of conductor 19 through resistance 20—21 conductor 22 resistance 23 and conductor 24 with galvanometer 27 bridged across points where conductor 22 meets resistance 21 and conductor 19 meets resistance 20 by means of conductors 25—26, the energy for this electric circuit being supplied by battery 28 through conductors 29—30.

Figure 3:
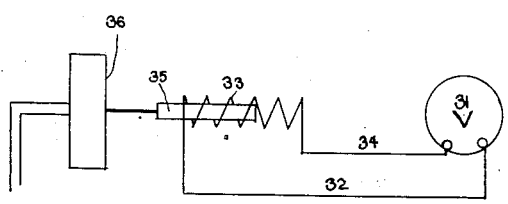
Figure 3 shows the galvanometric circuit with movable plunger solenoid for repeating and amplifying impulses electrically.

In Figure 3 the amplifying circuit is composed of voltmeter 31 conductor 32 coil 33 and conductor 34 and actuated by difference in current and energy that is generated in the circuit by the movement of magnetized plunger 35 in and out of coil 33 due to the vibrations of diaphragm 36.

I claim:

An indicating device for diagnostic purposes, comprising a closed vessel having a diaphragm forming one wall thereof, a microphonic device operatively connected to said diaphragm, an electric indicating device having its terminals in a circuit including a source of energy and said microphonic device, a pneumatic contact device adapted to be applied to a part of the human body, and a flexible connection between said contact device and said vessel.

In testimony whereof I affix my signature in presence of two witnesses.

SYDNEY N. BARUCH.

Witnesses:
 MAY KOCH,
 J. F. MANCHESTER.